(12) United States Patent
Kimura et al.

(10) Patent No.: US 11,977,156 B2
(45) Date of Patent: May 7, 2024

(54) OPTICAL DISTANCE MEASURING DEVICE

(71) Applicant: DENSO CORPORATION, Kariya (JP)

(72) Inventors: Teiyu Kimura, Kariya (JP); Isamu Takai, Kariya (JP)

(73) Assignee: DENSO CORPORATION, Kariya (JP)

( * ) Notice: Subject to any disclaimer, the term of this patent is extended or adjusted under 35 U.S.C. 154(b) by 932 days.

(21) Appl. No.: 16/997,182

(22) Filed: Aug. 19, 2020

(65) Prior Publication Data
US 2020/0379111 A1    Dec. 3, 2020

Related U.S. Application Data

(63) Continuation of application No. PCT/JP2019/005625, filed on Feb. 15, 2019.

(30) Foreign Application Priority Data

Feb. 20, 2018    (JP) .................... 2018-27610

(51) Int. Cl.
| | | |
|---|---|---|
| *G01S 17/10* | (2020.01) | |
| *G01S 17/89* | (2020.01) | |
| *G01S 17/894* | (2020.01) | |
| *G06T 7/50* | (2017.01) | |

(52) U.S. Cl.
CPC .............. *G01S 17/10* (2013.01); *G01S 17/89* (2013.01); *G01S 17/894* (2020.01); *G06T 7/50* (2017.01); *G06T 2207/20072* (2013.01)

(58) Field of Classification Search
CPC ........ G01S 17/10; G01S 17/894; G01S 17/89; G01S 7/487; G01S 17/42; G01S 17/931; G01S 7/4863; G06T 7/50; G06T 2207/20072

USPC ......................................................... 356/5.01
See application file for complete search history.

(56) References Cited

U.S. PATENT DOCUMENTS

2010/0046802 A1    2/2010    Watanabe et al.

FOREIGN PATENT DOCUMENTS

| JP | 2006-105694 A | 4/2006 |
|---|---|---|
| JP | 2014-077658 A | 5/2014 |
| JP | 2014-081254 A | 5/2014 |
| JP | 2016-161438 A | 9/2016 |
| JP | 2016-176750 A | 10/2016 |

*Primary Examiner* — Daniel L Murphy
(74) *Attorney, Agent, or Firm* — MASCHOFF BRENNAN

(57) ABSTRACT

An optical distance measuring device includes: a light source unit; a light receiving unit that includes a plurality of light receiving elements; an addition unit that adds the number of pulse signals; a histogram generation unit that generates a histogram that records the addition value for each time of flight; a peak detection unit that determines a distance value from the time of flight corresponding to the peak; an image generation unit that generates signal intensity image data and distance image data; a low signal intensity element detection unit that detects a low signal intensity element from the elements of the signal intensity image data; and an image correction unit that corrects a distance value recorded in a target element corresponding to the low signal intensity element in accordance with a distance value of at least one other element in the elements of the distance image data.

4 Claims, 9 Drawing Sheets

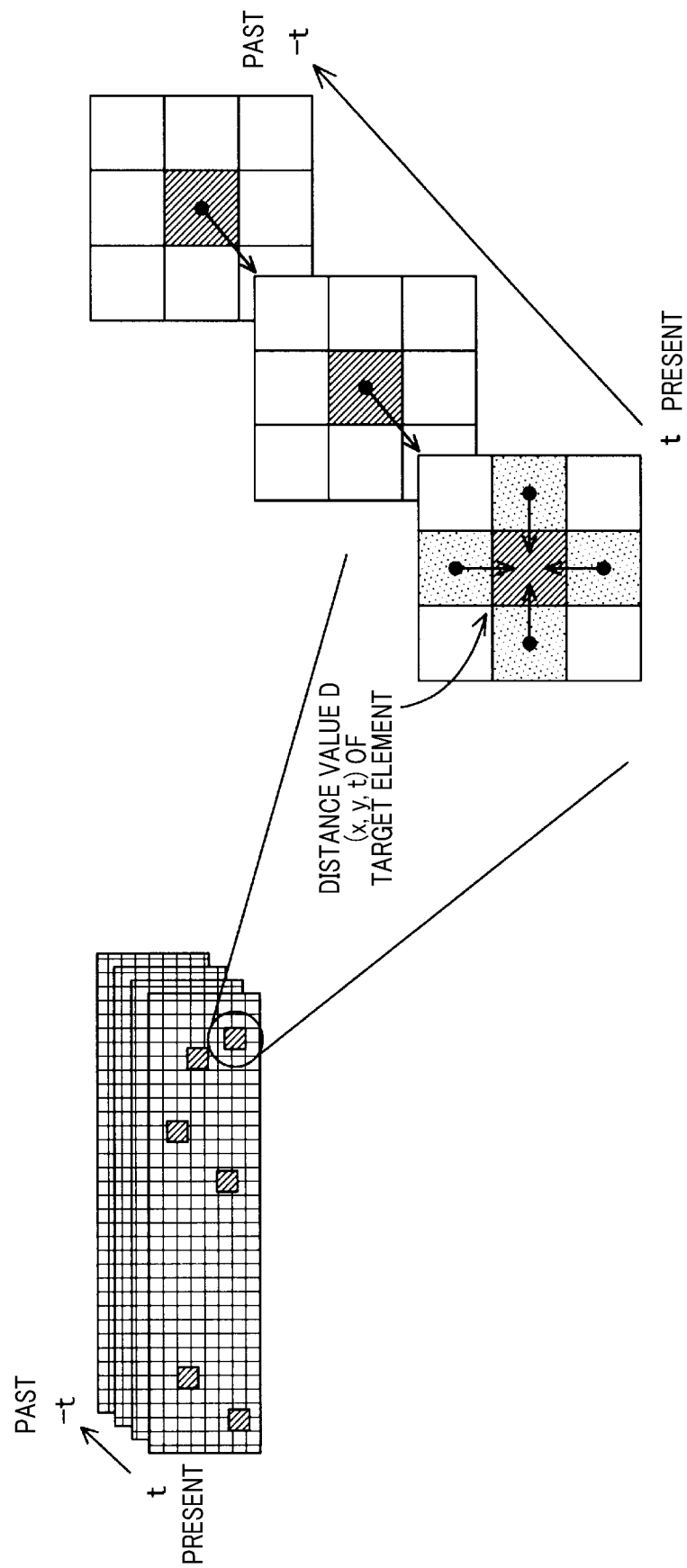

OPTICAL DISTANCE MEASURING DEVICE

CROSS-REFERENCE TO RELATED APPLICATION

The present application is a continuation application of International Application No. PCT/JP2019/005625, filed on Feb. 15, 2019, which claims priority to Japanese Patent Application No. 2018-27610, filed on Feb. 20, 2018. The contents of these applications are incorporated herein by reference in their entirety.

TECHNICAL FIELD

The present disclosure relates to an optical distance measuring device.

BACKGROUND ART

Optical distance measuring devices that measure a distance to a measurement object include devices called laser radars. The laser radars measure a distance to a measurement object on the basis of time of flight (TOF) required for light emitted from a light emitting element to be reflected by the measurement object and returned to the light receiving element.

SUMMARY

In the present disclosure, provided is an optical distance measuring device as the following. The optical distance measuring device includes: a light source unit; a light receiving unit that includes a plurality of light receiving elements; an addition unit that adds the number of pulse signals outputted from the light receiving elements to obtain an addition value for each light receiving element; a histogram generation unit that generates, for each light receiving element, a histogram that records the addition value for each time of flight that indicates a time required from emission of the light to reception of reflected light; a peak detection unit that detects a peak in the histogram for each light receiving element, and acquires the addition value at the peak as a signal intensity for each light receiving element, and determines, for each light receiving element, a distance value from the time of flight corresponding to the peak; an image generation unit that associates, based on the signal intensities for the light receiving elements, a corresponding value of the signal intensities with each element included in a region corresponding to the range to generate signal intensity image data and associates, based on the distance values for the light receiving elements, a corresponding value of the distance values with each element included in the region corresponding to the range to generate distance image data; a low signal intensity element detection unit that detects, from the elements of the signal intensity image data, a low signal intensity element having a signal intensity lower than a predetermined threshold; and an image correction unit that corrects a distance value recorded in a target element of the distance image data corresponding to the low signal intensity element in accordance with a distance value of at least one other element in the elements of the distance image data.

BRIEF DESCRIPTION OF THE DRAWINGS

The above object and other objects, features, and advantages of the present disclosure will be more clarified by the following detailed description with reference to the accompanying drawings, wherein:

FIG. 10 is a diagram showing a correction method.

DETAILED DESCRIPTION OF THE PREFERRED EMBODIMENTS

[PTL 1] JP 2016-176750 A

Figure 1:
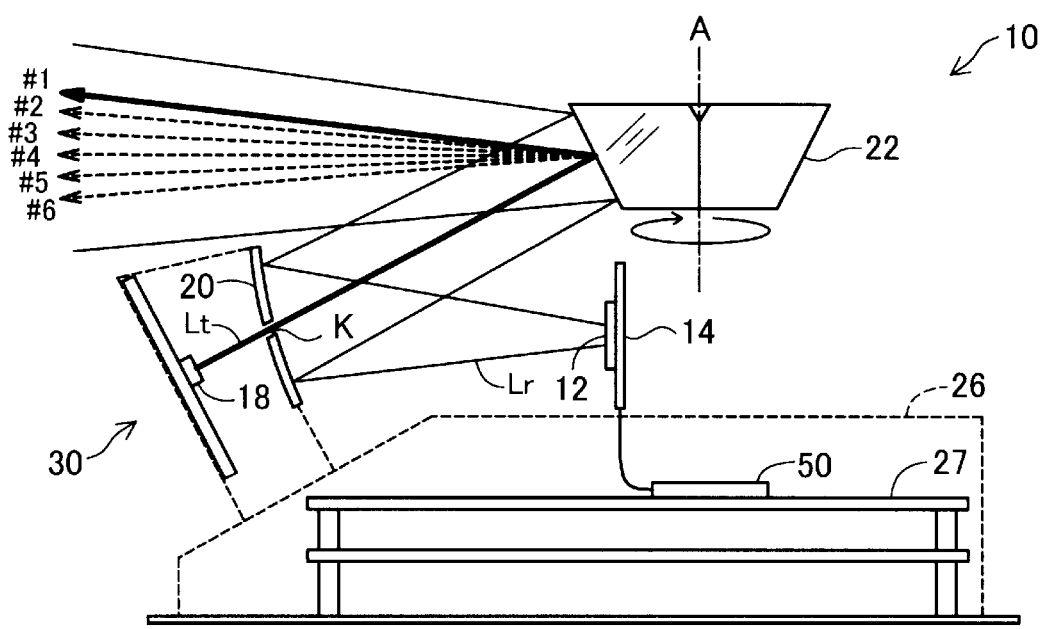
FIG. 1 is an explanatory diagram showing a schematic configuration of an optical distance measuring device.

Such an optical distance measuring device in Patent Literature 1 is, for example, mounted on a vehicle and used to detect an obstacle and measure a distance to the obstacle. Thus, the optical distance measuring devices are required to have high measurement accuracy.

The present disclosure has been made to solve at least some of the problems described above, and can be implemented as the following embodiment.

An embodiment of the present disclosure provides an optical distance measuring device. The optical distance measuring device is characterized by including: a light source unit that emits light to a predetermined range; a light receiving unit that includes a plurality of light receiving elements for outputting a pulse signal in response to incidence of reflected light from an object irradiated with the light; an addition unit that adds the number of pulse signals outputted from the light receiving elements to obtain an addition value for each light receiving element; a histogram generation unit that generates, for each light receiving element, a histogram that records the addition value for each time of flight that indicates a time required from emission of the light to reception of reflected light; a peak detection unit that detects a peak in the histogram for each light receiving element, and acquires the addition value at the peak as a signal intensity for each light receiving element, and determines, for each light receiving element, a distance value from the time of flight corresponding to the peak; an image generation unit that associates, based on the signal intensities for the light receiving elements, a corresponding value of the signal intensities with each element included in a region corresponding to the range to generate signal intensity image data and associates, based on the distance values for the light receiving elements, a corresponding value of the distance values with each element included in the region corresponding to the range to generate distance image data; a low signal intensity element detection unit that detects, from the elements of the signal intensity image data, a low signal intensity element having a signal intensity lower than a predetermined threshold; and an image correction unit that corrects a distance value recorded in a target element of the distance image data corresponding to the low signal intensity element in accordance with a distance value of at least one other element in the elements of the distance image data.

According to the optical distance measuring device of the embodiment, a distance value in distance image data calculated on the basis of a histogram having a low signal intensity can be corrected by using another distance value. Thus, even when light is not sufficiently reflected by an object, a distance to the object can be accurately measured. Furthermore, in the above embodiment, instead of performing the correction for all the elements of the distance image data, only the distance value calculated on the basis of the histogram having a low signal intensity is corrected. Accordingly, it is possible to prevent a reduction in performance of detecting a small object due to a reduced spatial resolution of the entire distance image data and a reduction in performance of detecting an object moving at a high speed due to a reduced time resolution of the entire distance image data. Therefore, it is possible to provide an optical distance measuring device having high measurement accuracy.

The present disclosure can also be implemented in various forms other than the optical distance measuring device. For example, the present disclosure can also be implemented in the form of a light distance measuring method, a vehicle equipped with the optical distance measuring device, a method of controlling the optical distance measuring device, or the like.

A. First Embodiment

As shown in FIG. 1, an optical distance measuring device 10 as a first embodiment of the present disclosure includes a light source unit 30, a light receiving IC 14, a hyperboloidal mirror 20, a polygon mirror 22, a housing 26, and a control unit 50. The optical distance measuring device 10 is, for example, mounted on a vehicle and used to detect obstacles and measure distances to those obstacles.

The light source unit 30 generates irradiation light Lt emitted to a predetermined measurement target range. In the present embodiment, the light source unit 30 includes a laser diode element 18 as a light source. As the irradiation light Lt, the laser diode element 18 emits a pulse laser beam that repeatedly flashes with a predetermined pulse width and cycle. The irradiation light Lt is guided from an opening K provided on the hyperboloidal mirror 20 to the polygon mirror 22. The pulse laser beam emitted from the light source unit 30 has a profile that is elongated in the vertical direction. In the present embodiment, the light source is the laser diode element 18. However, the light source may be another light source such as a solid-state laser.

The polygon mirror 22 is a rotary polygon mirror having six mirror surfaces. In the polygon mirror 22, each of the mirror surfaces reflects the irradiation light Lt and irradiates the measurement target range with the irradiation light Lt. When an object is present in the measurement target range, the irradiation light Lt is reflected by the object and guided to the polygon mirror 22. In the polygon mirror 22, the reflected light received from the measurement target range is reflected by each of the mirror surfaces and guided to the hyperboloidal mirror 20.

The hyperboloidal mirror 20 collects the reflected light guided by the polygon mirror 22 and guides the collected light as received light Lr to a light receiving unit 12 of the light receiving IC 14. The hyperboloidal mirror 20 has an effect similar to that of a lens, and forms an image of the received light Lr on the light receiving unit 12 of the light receiving IC 14.

The mirror surfaces of the polygon mirror 22 are provided to be inclined with respect to a rotation axis A. The polygon mirror 22 is rotated around the rotation axis A at a predetermined rotation speed. The mirror surfaces of the polygon mirror 22 are arranged at different angles with respect to the rotation axis A. Accordingly, due to the rotation of the polygon mirror 22, angles of depression of the irradiation light Lt and the reflected light are changed. Thus, by rotating the polygon mirror 22, the irradiation light Lt from the light source unit 30 is scanned not only in a horizontal direction but also in a vertical direction at different angles of depression. As a result, the irradiation light Lt from the polygon mirror 22 is scanned in a planar manner and projected toward the measurement target range.

The housing 26 includes a support structure that supports the components described above and also includes a control substrate 27. The control substrate 27 is provided with the control unit 50. The control unit 50 is configured as a computer including a CPU and a memory. The control unit 50 includes an input interface and an output interface. The input interface is connected to the light receiving IC 14, and the output interface is connected to, for example, an ECU (Electronic Control Unit) of the vehicle. The control unit 50 outputs distance image data (described later in detail) generated by the light receiving IC 14 to the ECU. On the basis of the distance image data acquired from the control unit 50, the ECU of the vehicle detects an obstacle and measures a distance to the obstacle.

Figure 2:
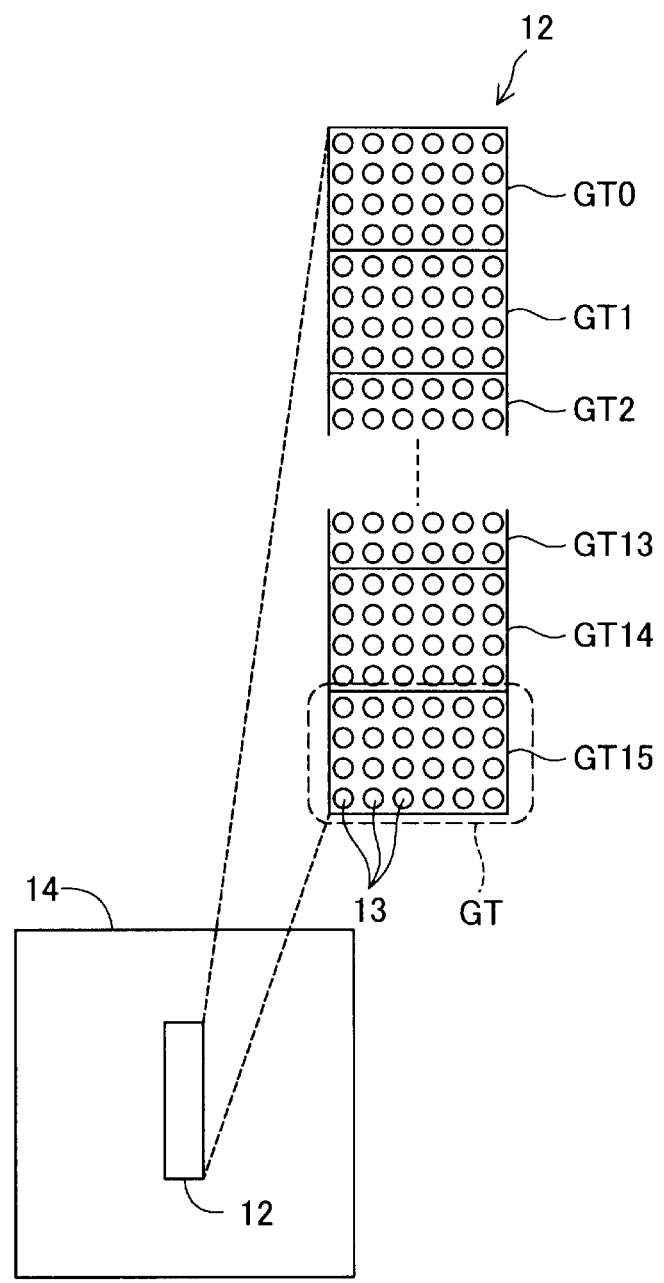
FIG. 2 is an explanatory diagram showing a schematic configuration of a light receiving unit.

As shown in FIG. 2, the light receiving IC 14 includes the light receiving unit 12. The light receiving unit 12 includes a plurality of light receiving elements capable of outputting a pulse signal according to incidence of reflected light from an object. In the present embodiment, as the light receiving elements, the light receiving unit 12 include SPADs (single photon avalanche diodes) 13. The light receiving unit 12 is configured as a silicon photomultiplier (SiPM) in which the plurality of SPADs 13 are arranged in an array. The light receiving unit 12 is configured such that 16 pixels GT (GT0 to GT15) are arranged in the vertical direction, each of 16 pixels GT is composed of 6 SPADs 13 in width×4 SPADs 13 in length, i.e., 24 SPADs 13 in total. A size of a single pixel GT corresponds to a size of a single element of signal intensity image data and distance image data (described later). When light (photon) enters the SPAD 13, the SPAD 13 outputs a pulse signal at a certain probability. Thus, each pixel GT outputs 0 to 24 pulse signals according to an intensity of the received light.

Figure 3:
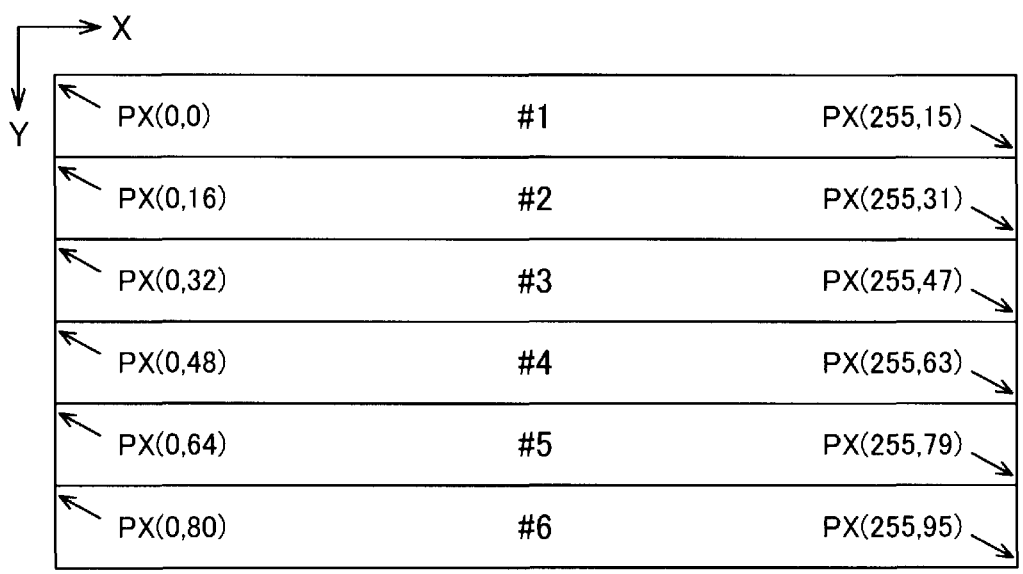
FIG. 3 is an explanatory diagram showing a region corresponding to a measurement target range.

Each pulse laser beam emitted from the light source unit 30 has a profile that is elongated in the vertical direction, and the pixels GT of the light receiving unit 12 are also arranged in the vertical direction. The reflected light returns to the optical distance measuring device 10 while also maintaining the elongated profile. Accordingly, the received light Lr having the elongated profile enters the light receiving unit 12 in the arrangement direction of the pixels GT. Thus, the light receiving unit 12 collectively receives the elongated reflected light pulse corresponding to 16 pixels GT. The irradiation light Lt and the received light Lr are scanned in the horizontal direction and the vertical direction by the rotation of the polygon mirror 22. Accordingly, the light scanned by the rotation of the polygon mirror 22 successively enters the light receiving unit 12. In the present embodiment, as shown in FIG. 3, by ⅙ rotation of the polygon mirror 22, a single mirror surface scans a strip-shaped region for 16 elements in a Y direction, and by a single rotation of the polygon mirror 22, the six mirror surfaces scan a planar region for 96 elements (=16 pixels×6 surfaces) in the Y direction. In the present embodiment, the number of elements in an X direction is 256. The planar region shown in FIG. 3 corresponds to the measurement target range irradiated with light emitted by the light source unit 30.

Figure 4:
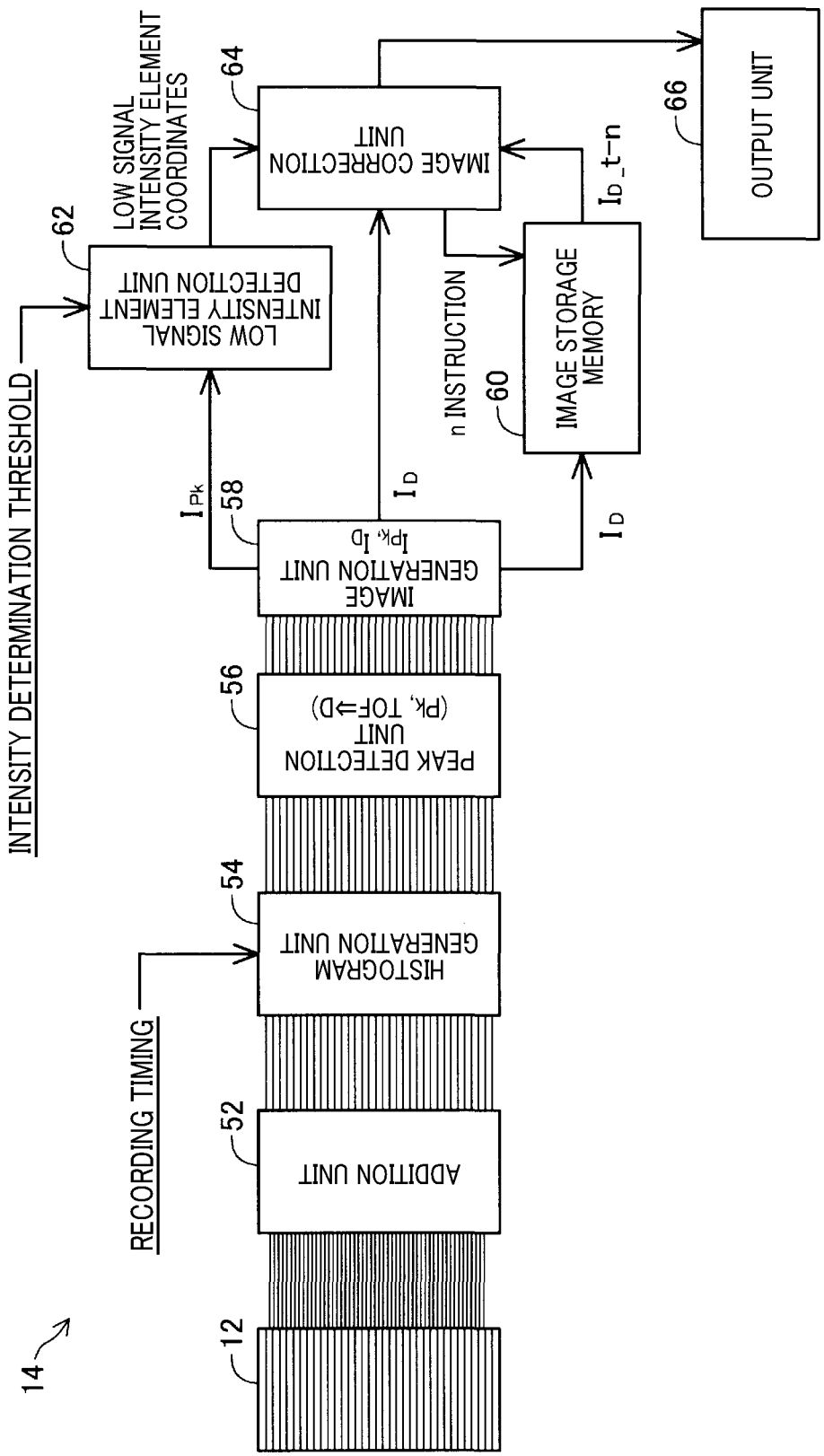
FIG. 4 is a block diagram of a light receiving IC.

A configuration of the light receiving IC 14 will be described with reference to FIG. 4. The light receiving IC 14 includes the light receiving unit 12, an addition unit 52, a histogram generation unit 54, a peak detection unit 56, an image generation unit 58, an image storage memory 60, a low signal intensity element detection unit 62, an image correction unit 64, and an output unit 66. Among these components, the components except for the light receiving unit 12 and the image storage memory 60 may be implemented as functional units that are implemented in software by the CPU of the control unit 50 executing a program.

The addition unit 52 is a circuit that adds the number of pulse signals outputted from the light receiving unit 12 to obtain an addition value. More specifically, for each pixel GT, the addition unit 52 counts the number of pulse signals simultaneously outputted from the plurality of SPADs 13 included in each pixel GT to obtain an addition value for each pixel GT. For example, when pulse signals are outputted from 12 SPADs 13 of the plurality of SPADs included in a single pixel GT, the addition unit 52 outputs "12" as the addition value to the histogram generation unit 54. FIG. 4 shows the single addition unit 52 in a collective manner. However, the addition unit 52 is provided for each pixel GT of the light receiving unit 12.

Figure 5:
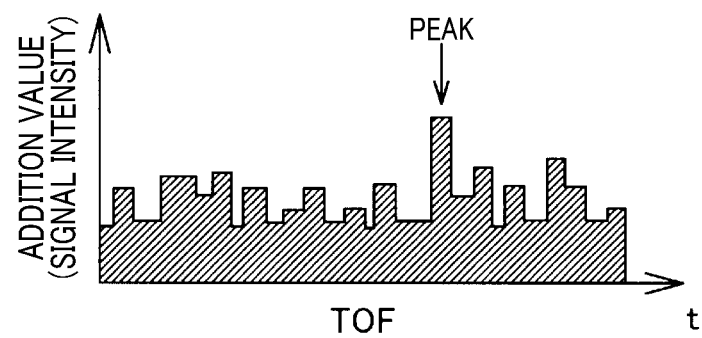
FIG. 5 is a diagram showing an example of a histogram.

The histogram generation unit 54 is a circuit that generates a histogram on the basis of the addition value outputted from the addition unit 52. FIG. 5 shows an example of the histogram. Each bin (horizontal axis) of the histogram represents time of flight of light required from emission of light to reception of reflected light (received light). Hereinafter, the time is referred to as TOF (Time Of Flight). On the other hand, a frequency (vertical axis) of the histogram represents the addition value calculated by the addition unit 52, which is an intensity of light reflected by an object. According to a recording timing in synchronization with a timing of the scanning by the light source unit 30 and the polygon mirror 22, the histogram generation unit 54 records, for each TOF, the addition value outputted from the addition unit 52 to generate a histogram. When an object is present in the measurement target range, light is reflected by the object, and the addition value is recorded in a bin of TOF according to a distance to the object. A peak in the histogram indicates that the object is present at a position (distance) that corresponds to TOF corresponding to the peak. The frequency of the part of the histogram in which no peak appears mostly indicates noise due to an influence of disturbance light. FIG. 4 shows the single histogram generation unit 54 in a collective manner. However, the histogram generation unit 54 is provided for each pixel GT. Thus, a histogram is generated for each of all the elements in the region shown in FIG. 3. By scanning a single pixel GT multiple times and adding the frequency of the histogram, an SN ratio of the histogram can be improved.

The peak detection unit 56 (FIG. 4) is a circuit that detects a peak in the histogram. The peak detection unit 56 acquires the frequency (addition value) at the detected peak as a signal intensity and obtains a distance value from TOF corresponding to the peak. The peak detection unit 56 calculates the distance value by the following equation (1), where "t" is TOF, "c" is the speed of light, and "D" is the distance value.

$$D = (c \times t)/2 \qquad \text{Equation (1)}$$

Figure 6:
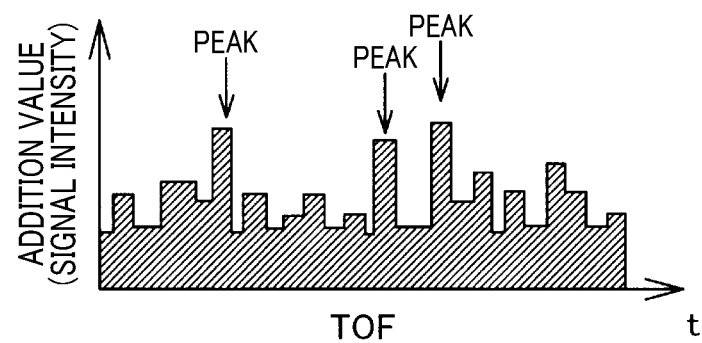
FIG. 6 is a diagram showing another example of the histogram.

FIG. 5 shows the example in which a single peak appears in the histogram. However, as shown in FIG. 6, in some cases, a plurality of peaks appear in the histogram. This is because in some cases, while a single histogram is generated, a positional relationship between the object in the measurement target range and the optical distance measuring device 10 is changed, and reflected light from different objects reaches the same pixel GT. Therefore, in the present embodiment, when a plurality of peaks are present in a single histogram, the peak detection unit 56 calculates the distance value on the basis of a peak having the highest frequency. The present disclosure is not limited to this, and the peak detection unit 56 may obtain the distance value, for example, on the basis of a peak at a predetermined ranking (e.g., a peak having the second highest frequency) or on the basis of a peak having the longest TOF or a peak having the shortest TOF.

Figure 7:
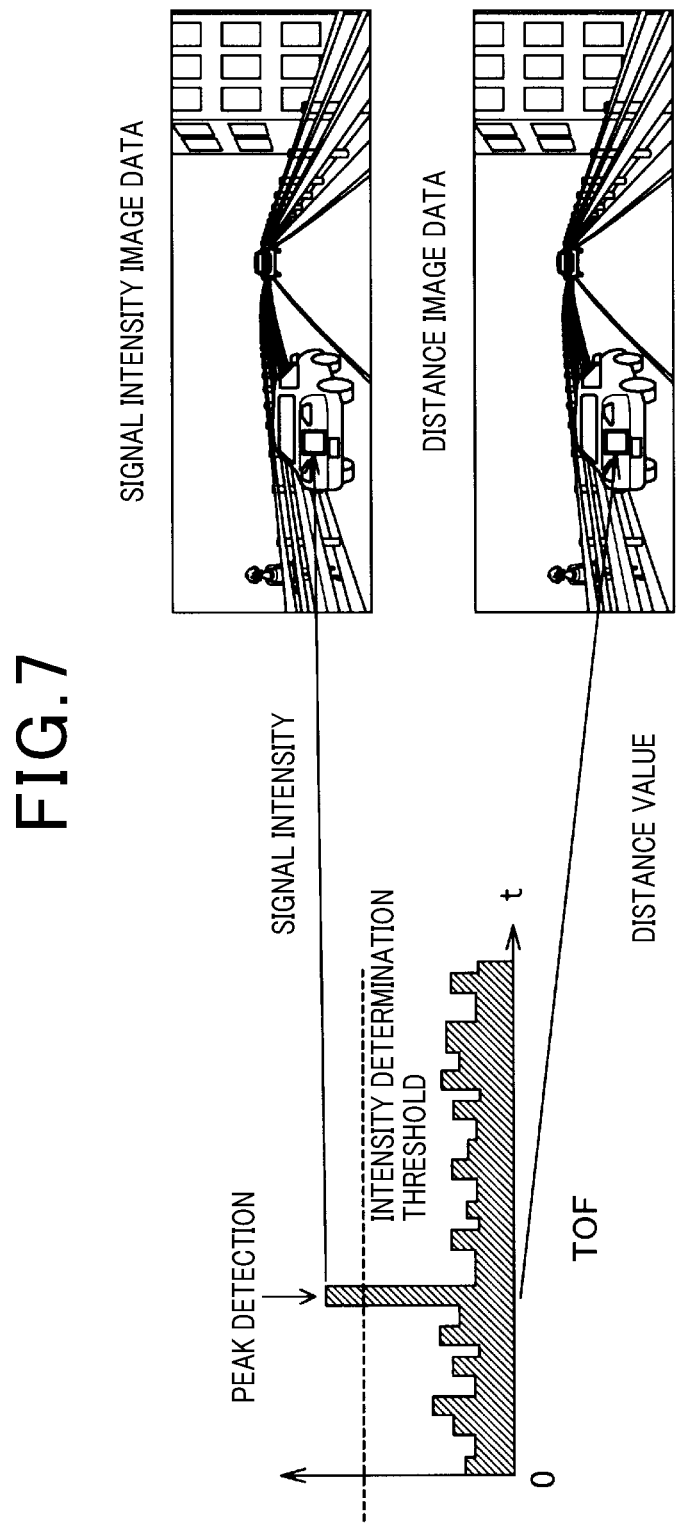
FIG. 7 is a diagram showing a method of generating signal intensity image data and distance image data.

The image generation unit 58 (FIG. 4) is a circuit that generates signal intensity image data ($I_{Pk}$) and distance image data ($I_D$). As shown in FIG. 7, the image generation unit 58 associates the signal intensity at the peak detected by the peak detection unit 56 with each of the elements in the region shown in FIG. 3 to generate signal intensity image data. Furthermore, the image generation unit 58 associates the distance value calculated from TOF by the peak detection unit 56 with each of the elements in the region shown in FIG. 3 to generate distance image data. As shown in FIG. 4, the image generation unit 58 outputs the generated signal intensity image data ($I_{Pk}$) to the low signal intensity element detection unit 62. Furthermore, the image generation unit 58 stores the generated distance image data ($I_D$) in the image storage memory 60 and also outputs the generated distance image data ($I_D$) to the image correction unit 64. In the image storage memory 60, a predetermined number of pieces of distance image data are sequentially stored from the newer data and sequentially deleted from the older data.

The low signal intensity element detection unit 62 is a circuit that detects, from the signal intensity image data generated by the image generation unit 58, a low signal intensity element having the signal intensity lower than a predetermined intensity determination threshold. The low signal intensity element detection unit 62 outputs coordinates of the detected low signal intensity element to the image correction unit 64. The intensity determination threshold can be determined in advance by performing an experiment for evaluating, in various environments, a signal intensity at which an error between a measured distance value and an actual distance value is reduced.

The image correction unit 64 is a circuit that corrects the distance image data. The image correction unit 64 corrects the distance image data by determining an element of the distance image data corresponding to the low signal intensity element on the basis of the coordinates acquired from the low signal intensity element detection unit 62, and correcting a distance value of the element (hereinafter also referred to as "target element") on the basis of a distance value of another element. The corrected distance image data is outputted to the output unit 66.

Figure 8:
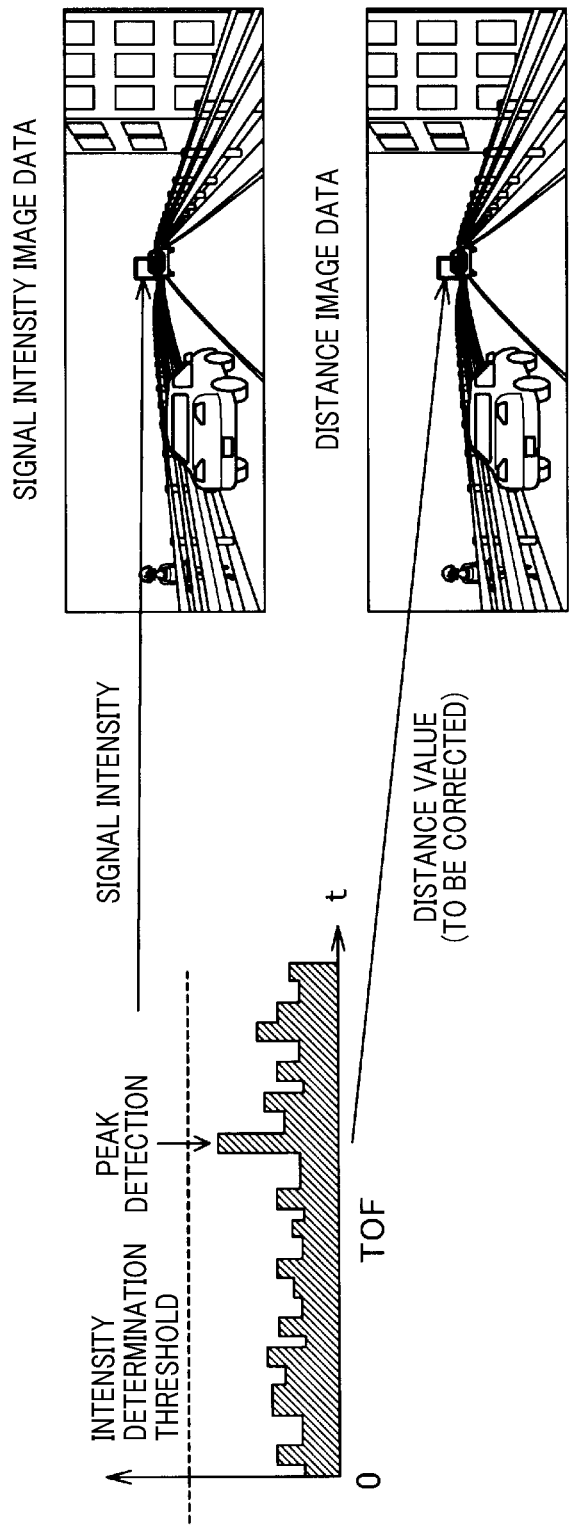
FIG. 8 is a diagram illustrating an element subjected to correction.

The target element subjected to the correction will be described with reference to FIGS. 7 and 8. A peak in a histogram shown in FIG. 7 exceeds the predetermined intensity determination threshold. In this case, a signal intensity at the peak can be said to be a sufficiently reliable value. Accordingly, a distance value is obtained from a TOF value corresponding to the peak, and the obtained distance value is recorded as it is in the distance image data. Thus, when the peak exceeds the intensity determination threshold, the distance value calculated by the above equation (1) is used as it is. On the other hand, a peak in a histogram shown in FIG. 8 is lower than the intensity determination threshold. Thus, a signal intensity at the peak has a low frequency and cannot be said to be a reliable value. Accordingly, when a distance value is obtained from a TOF value corresponding to the peak, the distance value is highly likely to include an error. Thus, in the present embodiment, such a distance value is to be corrected by using a distance value of another element. As shown in FIG. 8, the element subjected to the correction is, for example, an element corresponding to a position of an object that is present at a position distant from the optical distance measuring device 10.

Figure 9:
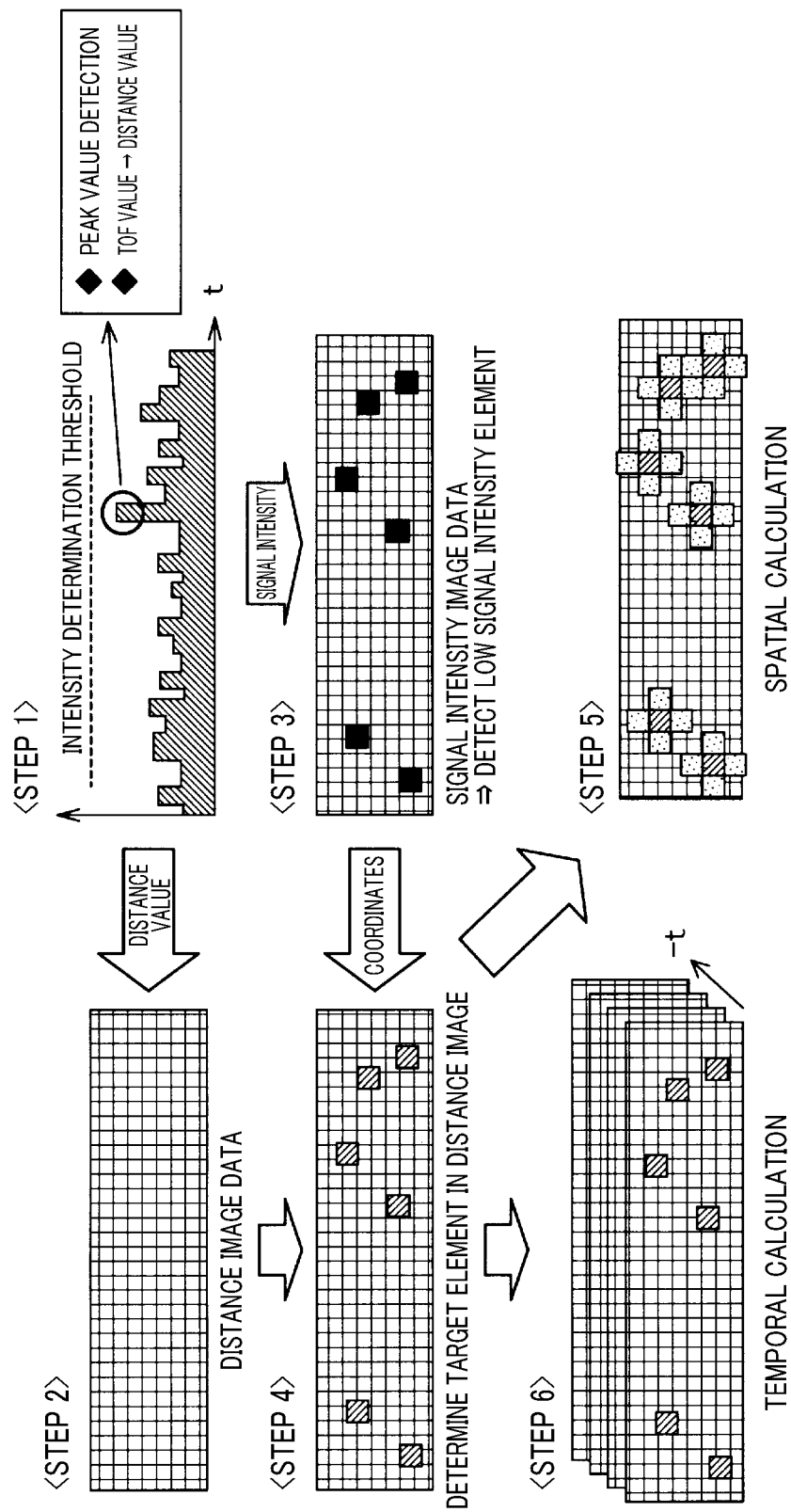
FIG. 9 is a diagram showing a process flow until a correction process is performed.

A process flow until a correction process is performed by the image correction unit 64 will be described with reference to FIG. 9. First, the histogram generation unit 54 generates a histogram (step 1). On the basis of the histogram, the image generation unit 58 generates distance image data (step 2) and generates signal intensity image data (step 3). From the signal intensity image data, the low signal intensity element detection unit 62 detects a low signal intensity element, and outputs coordinates of the detected low signal intensity element to the image correction unit 64. From the distance image data, the image correction unit 64 determines a target element corresponding to the coordinates (step 4). For a distance value of the target element of the distance image data, the image correction unit 64 performs spatial calculation (step 5) and temporal calculation (step 6) to correct the distance value.

As shown in FIG. 10, in the present embodiment, the image correction unit 64 adds, to the distance value of the target element, distance values of four elements adjacent to the target element. The image correction unit 64 further adds, to the value obtained by the addition, a distance value (distance value before the correction) of an element at the same position in previous two pieces of distance image data recorded in the image storage memory 60. Then, the image correction unit 64 divides the total value by the number of added elements to obtain a spatial and temporal average value. The image correction unit 64 overwrites the distance value of the target element of the distance image data with the average value. The distance image data corrected in this manner is outputted through the output unit 66 to the ECU of the vehicle or the like and used to detect an obstacle and measure a distance to the obstacle.

According to the optical distance measuring device 10 of the present embodiment described above, a distance value in distance image data calculated on the basis of a histogram having a low signal intensity can be corrected by using another distance value. Thus, even in a case where light is not sufficiently reflected by an object, a distance to the object can be accurately measured. The case where light is not sufficiently reflected by an object is, for example, a case where the object is present at a distant position, a case where the object has a low reflectance, a case of bad weather, or the like.

In the present embodiment, instead of performing the correction for all the elements of the distance image data, only the distance value calculated on the basis of the histogram having a low signal intensity is corrected. Accordingly, it is possible to prevent a reduction in performance of detecting a small object due to a reduced spatial resolution of the entire distance image data and a reduction in performance of detecting an object moving at a high speed due to a reduced time resolution of the entire distance image data. Thus, the present embodiment can provide the optical distance measuring device 10 having high measurement accuracy.

In the present embodiment, the distance value of a target element is corrected by not only using the distance values of the elements around the target element in the current distance image data but also using the previous distance value of the target element in at least one previous distance image data, Therefore, a distance to the object can be more accurately measured.

B. Other Embodiments (B1) In the above embodiment, the image correction unit 64 corrects the distance value of the target element on the basis of both the distance values of the pixels around the target element and the previous distance values. However, the image correction unit 64 may correct the distance value of the target element by using only the distance values of the pixels around the target element. Alternatively, the image correction unit 64 may correct the distance value of the target element by using only the previous distance values. When the image correction unit 64 corrects the distance value of the target element by using only the distance values of the pixels around the target element, the previous distance image data does not need to be stored and thus the image storage memory 60 shown in FIG. 4 may be omitted.

(B2) In the above embodiment, the image correction unit 64 performs the correction by obtaining the average value of the distance values of the plurality of elements. However, the image correction unit 64 may perform the correction by using another representative value such as a median value or a mode value of the distance values of the plurality of elements.

(B3) In the above embodiment, the image correction unit 64 performs the correction by using the distance values of the elements adjacent to the target element in the four space directions. However, the image correction unit 64 may perform the correction by using a distance value of an element at a position farther from the target element. In this case, an element located farther from the target element in the space direction may have a smaller weight to have a smaller influence on the calculation result. Similarly, an element located farther from the target element in the time direction may have a smaller weight to have a smaller influence on the calculation result. That is, the image correction unit 64 may perform the correction by preferentially using a distance value of the element close to the target element in terms of distance and time.

(B4) In the above embodiment, the image correction unit 64 may exclude, from the calculation, a distance value of an element having a distance value significantly deviated from the distance value of the target element. In this manner, the measurement accuracy can be further improved.

(B5) In the above embodiment, when no peak can be detected in the histogram by the peak detection unit 56, no distance value is determined and thus no distance value is recorded in the distance image data. Thus, for an element in the distance image data for which no distance value is recorded, the image correction unit 64 may calculate an average value or a median value of distance values by using at least one of pixels around the element and previous elements, and record the calculated value. Alternatively, the image correction unit 64 may acquire a distance value from the corresponding element in previous distance image data, and record the distance value. In this manner, occurrence of an element having no distance value in the distance image data can be prevented.

(B6) The optical distance measuring device 10 of the above embodiment is a coaxial optical system in which an optical axis for the projection of light matches an optical axis for the reception of light. However, the optical distance measuring device 10 may be a non-coaxial optical system in which an optical axis for the projection of light differs from an optical axis for the reception of light. In the above embodiment, the pixels GT of the light receiving unit 12 are arranged in a line in the vertical direction. However, the pixels GT may be arranged in a planar manner in the vertical direction and the horizontal direction. Furthermore, a scanning method of the optical distance measuring device 10 may be a 1D scanning method in which strip-shaped light is scanned in a single direction, or may be a 2D scanning method in which point-like light is scanned in a two-dimensional direction. The optical distance measuring device 10 may be a flash-type device that emits light to a wide range without scanning light.

(B7) In the above embodiment, the number of mirror surfaces of the polygon mirror 22, the number of pixels GT constituting the light receiving unit 12, the number of SPADs 13 constituting the pixel GT, the number of elements of the signal intensity image data, and the number of elements of the distance image data are each an example. Therefore, the numbers of the items are not limited to the numbers shown in the above embodiment, and may be set as appropriate according to the specifications of the optical distance measuring device 10.

The present disclosure is not limited to the embodiments described above, and can be implemented in various configurations without departing from the scope of the present disclosure. For example, in order to solve some or all of the problems described above or to achieve some or all of the effects described above, replacement or combination may be performed as appropriate in the technical features in the embodiments corresponding to the technical features in each embodiment described in Summary of the Invention. Unless the technical features are described as essential in the present specification, the technical features may be deleted as appropriate.

What is claimed is:

1. An optical distance measuring device comprising:
   a light source unit that emits light to a predetermined range;
   a light receiving unit that includes a plurality of light receiving elements for outputting a pulse signal in response to incidence of reflected light from an object irradiated with the light;
   an addition unit that adds the number of pulse signals outputted from each light receiving element to obtain an addition value for each light receiving element;
   a histogram generation unit that generates, for each light receiving element, a histogram that records the addition value for each time of flight that indicates a time required from emission of the light to reception of the reflected light;
   a peak detection unit that detects a peak in the histogram for each light receiving element, acquires the addition value at the peak as a signal intensity for each light receiving element, and determines, for each light receiving element, a distance value from the time of flight corresponding to the peak;
   an image generation unit that associates, based on the signal intensities for the light receiving elements, a corresponding value of the signal intensities with each element included in a region corresponding to the range to generate signal intensity image data and associates, based on the distance values for the light receiving elements, a corresponding value of the distance values with each element included in the region corresponding to the range to generate distance image data;
   a low signal intensity element detection unit that detects, from the elements of the signal intensity image data, a low signal intensity element having a signal intensity lower than a predetermined threshold; and
   an image correction unit that corrects a distance value recorded in a target element of the distance image data corresponding to the low signal intensity element in accordance with a distance value of at least one other element in the elements of the distance image data.

2. The optical distance measuring device according to claim 1, wherein the image correction unit corrects the distance value recorded in the target element in accordance with distance values of selected elements in the distance image data, the selected elements being located around the target element in the distance image data.

3. The optical distance measuring device according to claim 1, wherein the distance image data is successively generated by the image generation unit as first distance image data and second distance image data after the first distance image data, and the image correction unit corrects the distance value recorded in the target element in the second distance image data in accordance with a distance value recorded in the corresponding target element in the first distance image data.

4. The optical distance measuring device according to claim 1, wherein the distance image data is successively generated by the image generation unit as first distance image data and second distance image data after the first distance image data, and the image correction unit corrects the distance value recorded in the target element in the second distance image data in accordance with:
   distance values of selected elements in the distance image data, the selected elements being located around the target element in the distance image data; and
   a distance value recorded in the corresponding target element in the first distance image data.

* * * * *